United States Patent [19]

Zimmermann

[11] 4,019,843
[45] Apr. 26, 1977

[54] FILM BLOWHEAD FOR PRODUCING TUBULAR FILM

[75] Inventor: Werner Josef Zimmermann, Lengerich of Westphalia, Germany

[73] Assignee: Windmöller & Hölscher, Lengerich of Westphalia, Germany

[22] Filed: Sept. 23, 1975

[21] Appl. No.: 616,069

[30] Foreign Application Priority Data

Sept. 24, 1974 Germany .......................... 2445545

[52] U.S. Cl. .............................. 425/72 R; 264/95; 425/326 R
[51] Int. Cl.² ........................................ B29D 23/04
[58] Field of Search ........... 425/72, 326 R; 264/88, 264/95, 90

[56] References Cited

UNITED STATES PATENTS

| | | | |
|---|---|---|---|
| 3,400,184 | 9/1968 | Matsuo et al. | 425/445 X |
| 3,709,290 | 1/1973 | Upmeier | 425/72 X |
| 3,714,309 | 1/1973 | Biglono | 425/72 X |
| 3,902,832 | 9/1975 | Gregory et al. | 425/72 |

Primary Examiner—Robert L. Spicer, Jr.
Attorney, Agent, or Firm—Fleit & Jacobson

[57] ABSTRACT

In a blowhead for producing tubular film from thermoplastic material flowing from an extruder, a central supply conduit branches into a plurality of radial distributing passages having their axes in substantially one plane. Each distributing passage extends into an axial passage portion that is parallel to the supply conduit and that opens into a distributing helix. Inlet and outlet tubes for cooling air are provided between the axial distributing passage portions.

4 Claims, 6 Drawing Figures

FILM BLOWHEAD FOR PRODUCING TUBULAR FILM

The invention relates to a film blowhead according to German Pat. No. 2,306,834 for producing tubular film from thermoplastic masses, comprising a central melt supply conduit and distributing passages which radiate therefrom towards the blowhead housing and open into a respective helical distributing helix of the blowhead insert, which helix forms with the blowhead housing an overflow gap that continuously increases in size, and comprising internal air cooling means with inlet and outlet passages for internal cooling air consisting of concentric tubes passing axially through the blowhead, wherein the concentric air guide passages are connected to the associated air conduits outside the blowhead by way of at least one air inlet and outlet tube for each, the air inlet and outlet tubes passing between adjacent distributing passages.

In order to obtain a high throughput of cooling air despite the central supply of the melt and thereby avoid uneven heating of the blowhead, the distributing passages in the case of the blowhead according to the aforementioned parent German patent extend in the surface of an obtuse-angled cone, the air inlet and outlet tubes extending substantially perpendicular through the surface of the cone. Good production results were obtained with such film blowheads. However, with film blowheads having a small nominal width it has proved difficult to provide air tubes of sufficiently large cross-section between the melt passages extending to the distributing helices from the central supply aperture because the circular sectors remaining between the melt passages extending along the obtuse-angled cone surface become too small.

It is therefore the object of the invention to find an arrangement for the distributing passages of the melt as well as for the air supply and withdrawal passages that, despite a small nominal width for the film blowhead, permits adequately large cross-sections to be obtained for the cooling air passages.

According to the invention, this object is achieved in a film blowhead according to the aforementioned parent German patent in that the distributing passages branching from the central melt supply conduit extend substantially in one radial plane to the marginal region of the blowhead insert and are deflected through 90° to be led therethrough substantially parallel to the axis up to where they open into the distributing helix, and that the air inlet and outlet tubes are disposed between the substantially axially parallel extending distributing passages in substantially radial planes. The construction of the film blowhead according to the invention makes it possible to provide passages of adequate diameters even with a smaller nominal width, the extension of the melt distributing passages in the blowhead insert leading to no marked deterioration of the film thickness tolerances.

In order to detract from uniform heating of the film blowhead as little as possible, the air inlet and outlet tubes preferably alternate in the radial plane. The air inlet and outlet tubes may also be led in superposed pairs between the distributing passages along a respective one of separate radial planes.

Even in the case of multi-layer film blowheads of the kind suggested in German Pat. Application No. 2,320,687, the air inlet and outlet tubes may be led between the axially parallel distributing passages along radial planes.

Examples of the invention will now be described with reference to the drawings in which:

FIG. 4 is a sectional view similar to FIG. 3 but illustrating two supply passages for cooling air and two withdrawal passages for warm air;

Figure 1:
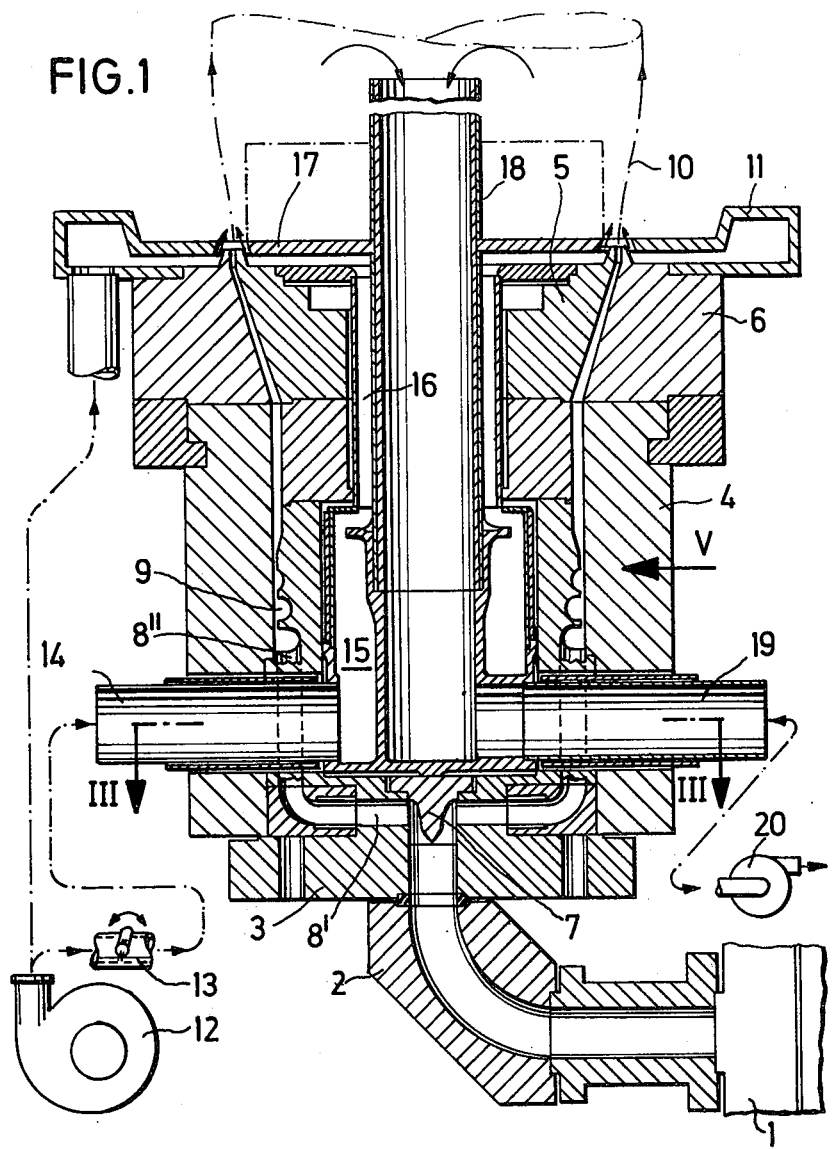
FIG. 1 is a longitudinal section through a film blowhead comprising supply and withdrawal passages for the cooling air disposed in one radial plane.

From the extruder indicated at 1, the melt is passed for example through the curved connection 2 into the distributing member 3 of the blowhead 4 having the nozzle rings 5 and 6. The stream of molten material is led into the distributing passages 8' via the distributing blades 7, the passages 8' extending along a preferably radial surface and then being deflected through about 90° in the direction of the nozzle outlet where, in the form of passages 8'', they open on the same surface of a cylinder into the distributing passage 9 from which the molten material passes out of the original circumferential flow into a longitudinal flow directed towards the nozzle orifice and is there formed into a tubular film 10 and taken off, flattened and coiled in the usual manner.

For the purpose of exterior cooling of the tubular film there is the cooling ring 11 of which the air supply is diagrammatically indicated by the fan 12 which also supplies the interior cooling air through a branch conduit provided with the throttle flap 13. The interior cooling air is led through the air inlet tube or tubes 14 into the collecting chamber 15 from which it passes through the air supply passage 16 in the form of an annular chamber and through the interior cooling ring 17 to the lip of interior nozzle ring 5. The heated interior air is then fed through the air outlet passage 18, which consists of a collecting tube disposed concentrically in the interior air supply passage 16 and preferably extends up to the flattening zone, and through the outlet tubes 19 and the diagrammatically indicated suction fan 20. The distributing or collecting tubes which distribute or collect the streams of air in the case of a plurality of air tubes 14, 19 are not illustrated; nor is there any detail of the thermal insulation which is recommended for the air passages 14 to 19.

The air inlet tubes 14 and outlet tubes 19 extend substantially perpendicular along radial planes through the cylindrical surface defined by the distributing passages 8'' and they alternate with one another. The air inlet tubes 14 open into the annular chamber 15 whilst the air outlet tubes 19 branch off from the air outlet collecting tube 18.

As will be evident from the drawing, the air tubes 14, 19 extend to the outside along radial planes on the surface of the film blowhead housing 4. Spiral hoses can be readily connected to them without having to make contact with the hot parts of the blowhead that might cause them to become damaged.

FIG. 1 illustrates the cross-section of a film blowhead in which the air inlet tubes 14 or the air outlet tubes 19 alternate and are disposed in one radial plane.

Figure 2:
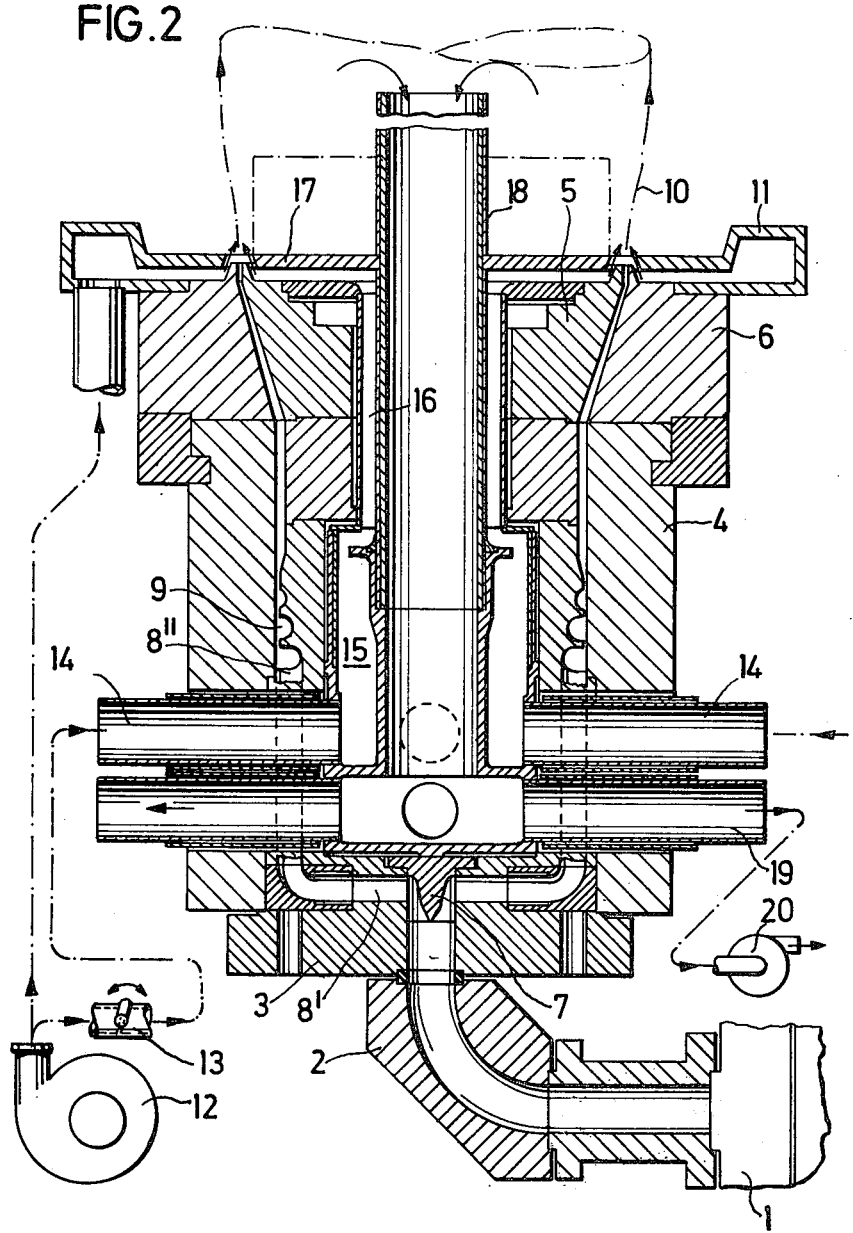
FIG. 2 is a longitudinal section through a film blowhead with air supply and withdrawal passages lying in separate radial planes.
Figure 3:
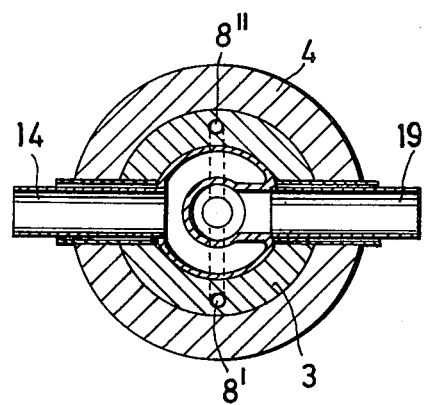
FIGS. 3 and 4 are cross-sections on the line III—III of FIG. 1 through a film blowhead with one supply passage for cooling air and one withdrawal passage for warm air.
Figure 4:
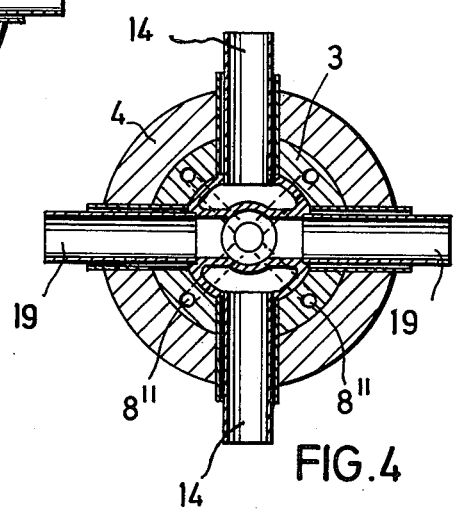
Figure 5:
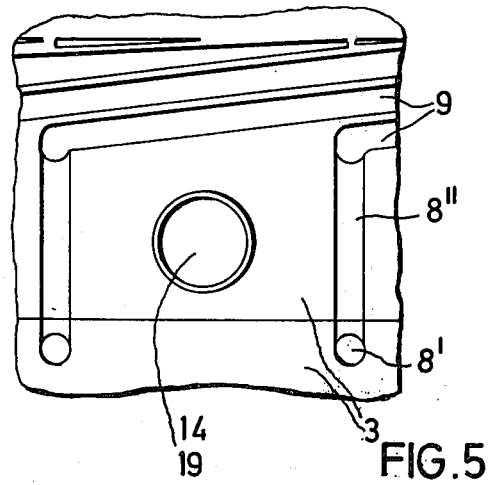
FIG. 5 is a fragmentary plan view of the surface of the blowhead insert that carries the distributing helix projected into the plane of the drawing.

FIG. 2 is a cross-section of a film blowhead in which the axially parallel melt passages 8″ are somewhat longer than in FIG. 1 so that one pair of air inlet tubes 14 or air outlet tubes 19 can be arranged between them in two radial planes, this resulting in particularly large air cross-sections.

Figure 6:
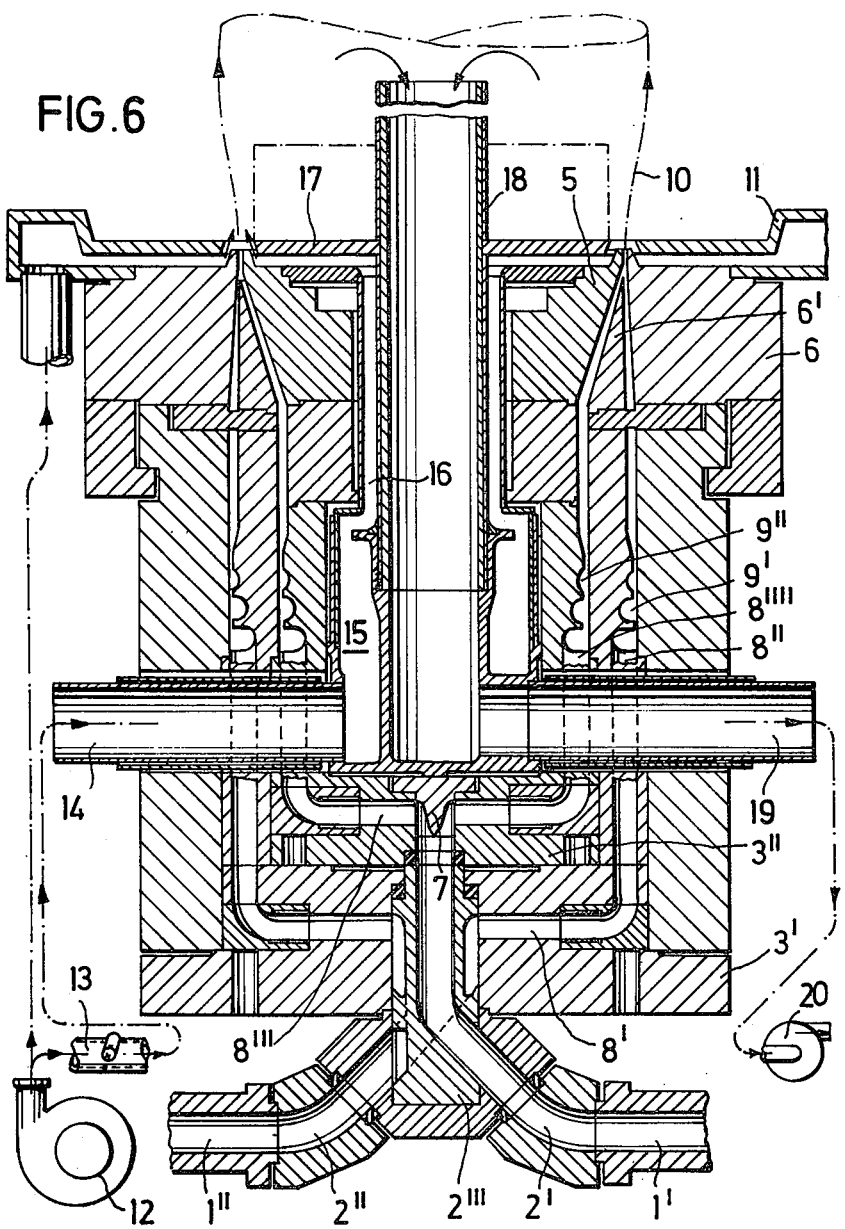
FIG. 6 is a longitudinal section through a two-layer film blowhead.

FIGS. 1 to 5 show the form of the air passages in the case of a single-layer film blowhead. The same system can, as shown in FIG. 6, also be applied to multi-layer film blowheads as described in the German Patent Application No. 2,320,687.

With these, the helical passages 9′, 9″ for the flow of molten material are provided in a plurality of concentric inserts between the axially parallel melt supply passages 8″, 8″″ of which the air inlet tubes 14 or air outlet tubes 19 can be provided in radial planes.

What is claimed is:

1. A film blowhead for producing tubular film from thermoplastic material comprising, in combination, a blowhead housing, a blowhead insert in said housing provided with a distributing helix defining with said housing an overflow gap that continuously increases in size, a central melt supply conduit, a plurality of distributing passages connected to said supply conduit extending radially outward from said supply conduit towards said blowhead housing and opening into said distributing helix, each of said distributing passages including a radial passage portion connected to said central melt supply conduit and extending in a common radial plane towards a marginal region of said blowhead insert and an axial passage portion extending upwardly at a right angle to said radial passage portion to open into said distributing helix, internal air cooling means including inlet and outlet tubes disposed in axially extending, concentric relationship to form inlet and outlet guide passages respectively for internal cooling air, at least one air inlet connected to said inlet guide passage and at least one outlet tube connected to said outlet guide passage, said at least one air inlet and outlet tubes being disposed between adjacent axial passage portions of said distributing passages in at least one radial plane.

2. A film blowhead according to claim 1 wherein said air inlet and outlet tubes are arranged in alternating relationships in said one radial plane.

3. A film blowhead according to claim 1 wherein said air inlet and outlet tubes are arranged in superposed pairs between said axial passage portions of said distributing passages with corresponding tubes in each of said pairs disposed in a common radial plane and with the radial planes in parallel relationship.

4. A film blowhead according to claim 1 wherein the film blowhead is of multi-layer type and wherein said air inlet and outlet tubes are disposed between said axial passage portions of said distributing passages in at least one radial plane.

* * * * *